DATA TRANSMISSION SYSTEM EMPLOYING A DIFFERENT SEQUENCE OF DISTINCT CONDITIONS TO REPRESENT THE TWO CONDITIONS OF A BINARY BIT
Filed Feb. 6, 1963
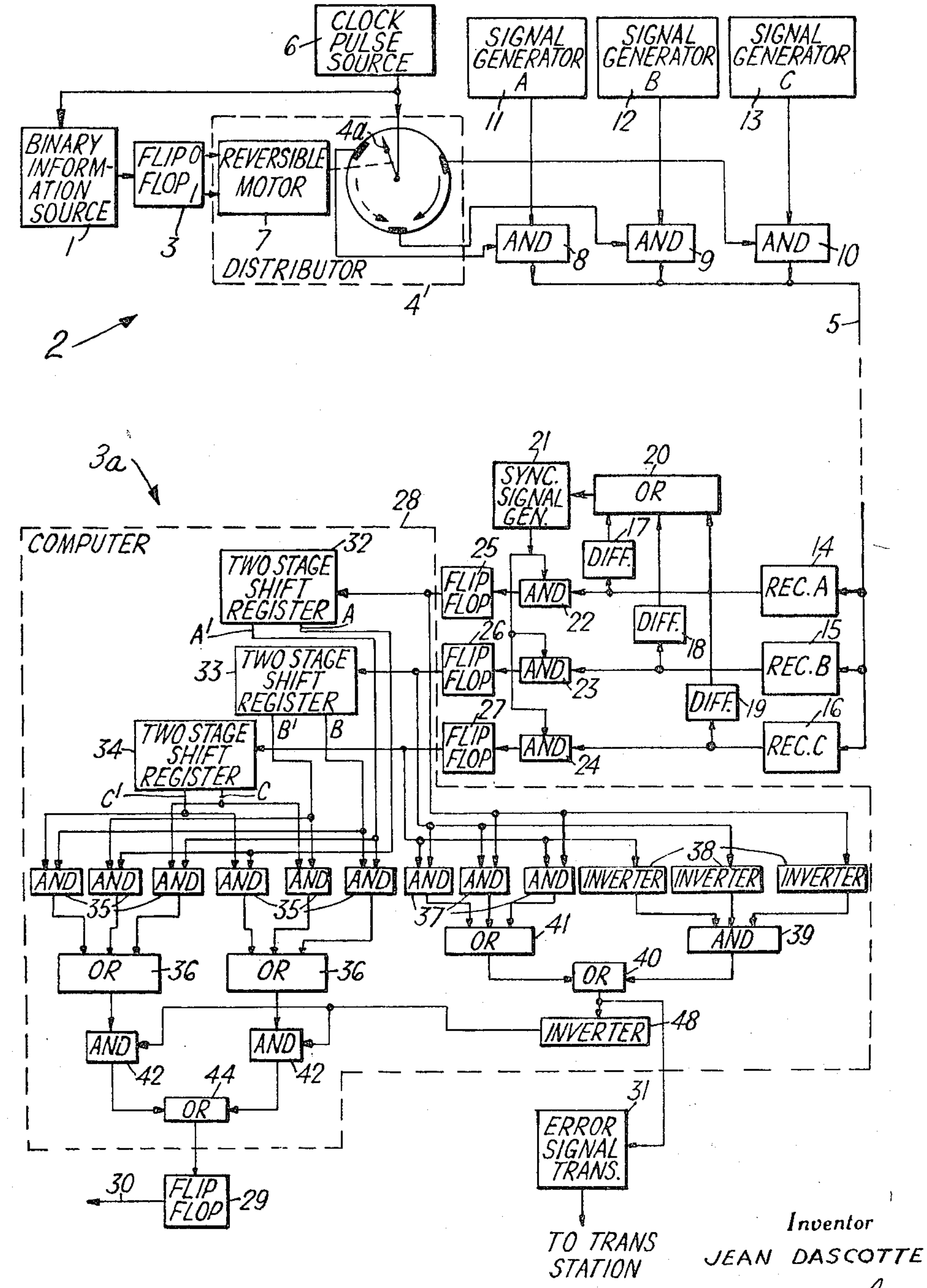
Inventor
JEAN DASCOTTE
By Percy P. Lantzy
Attorney United States Patent Office 3,292,147
Patented Dec. 13, 1966

3,292,147

DATA TRANSMISSION SYSTEM EMPLOYING A DIFFERENT SEQUENCE OF DISTINCT CONDITIONS TO REPRESENT THE TWO CONDITIONS OF A BINARY BIT

Jean Dascotte, Boulogne-Billancourt, France, assignor to International Standard Electric Corporation, New York, N.Y., a corporation of Delaware Filed Feb. 6, 1963, Ser. No. 256,630
Claims priority, application France, Feb. 14, 1962, 888,022, Patent 1,322,270
20 Claims. (Cl. 340—146.1)

This invention relates to transmission systems and more particularly to a data transmission system for transmitting information by binary code groups.

It is well known that information may be converted into code groups by sampling the information at a prescribed rate, each of the code groups including a plurality of digits or bits. Where the binary notation is employed the bits may assume two conditions generally designated as "1" and "0." The number of bits included in a code group in a binary code determines the number of levels to which the information may be quantized.

Transmission systems are known wherein the "1" and "0" conditions of the binary bits may be transmitted by amplitude modulation of a carrier wave having two amplitudes corresponding to the two conditions. Also it is known that the two binary conditions may be transmitted by a carrier wave having two frequencies, or phases corresponding to the two binary conditions. A system which is frequently used is the so-called frequency shift system in which one frequency transmitted corresponds to condition "1" and the other transmitted frequency corresponds to condition "0." It is also known, and it is frequently practiced in the art, to add to the information to be transmitted one or more bits resulting in a so-called parity signal which enables the detection and/or correction of transmission errors. It is also known that some systems include an arrangement to send a signal back to the transmitting end of the system requesting retransmission of the faulty bit or code group when an error is detected in the received signals.

An object of this invention is to provide a data transmission system employing binary code groups to transmit information having the advantages of the previously known transmission systems but having greater reliability and permitting the detection and correction of errors more easily.

A feature of the present invention is to provide a data transmission system transmitting information in binary form employing a plurality of distinct conditions of the transmission signal with a circular permutation or sequential application of the distinct conditions to the transmission medium for each bit of information contained within a binary code group, the binary content of each bit being defined by the direction of the sequential application or permutation of the distinct conditions to the transmission medium.

Another feature of this invention is the provision of a transmission system utilizing three frequencies as the distinct conditions of the transmitted signal, identified herein as A, B, and C. According to the invention the transmission system will be such that at each instant one frequency and only one is transmitted, and the binary information to be transmitted is represented by the sequential passing from one frequency to another with the two binary conditions of "1" and "0" being represented by the two possible sequences in applying the frequencies to the transmission medium, or the two possible directions of the circular permutation. For instance, the "0" condition will be represented by the passage from the initial frequency to the following in the sequence ABCABCA . . . and the "1" condition by the passage from the initial frequency to the following reverse sequence, namely ACBACBA. . . .

Another feature of this invention is the provision of an improved synchronization of the receiving end with the transmitting end by utilizing the frequency transitions for each binary bit at the receiving end to actuate the timing signal without requiring a separate synchronizing signal as is normally found in other types of binary data transmission systems.

In accordance with the system of this invention each of the three frequencies A, B, C is utilized on an average of one-third the total transmission time. A succession of "0," indicating, for instance the waiting condition, leads to the transmission of frequencies A, B, C with a permanent circular permutation in the same direction or, in other words, with a certain sequence of applying the frequencies to the transmission medium.

Another feature of this invention is the provision that in the transmission of a bit, that is, the passage from one frequency to another, depends upon the initial frequency, that is, the preceding passage and, on the other hand, controls the initial frequency of the following passage. Therefore, an inspection of the preceding and following bits enables the detection of a bit in error and, in certain instances, permits the correction of this faulty condition by, for instance, requesting retransmission of the faulty bit.

Another feature of this invention is the provision that the receiver includes a demodulater for each of the frequencies A, B, or C, or more generally, a device responding to each of the three distinct conditions of the transmitted signal. The demodulator remains in the rest condition at least two-thirds of the transmission time of a single bit and operates one-third of the bit transmission time. This resting of one of the demodulators for two-thirds of the bit time is important, except where there is a notable phase distortion, since the trailing edge of the output of the demodulator resulting from the last bit received will be reduced before this demodulator must respond to the next bit to be received. The resulting trailing edge of the output of the demodulator will be lower at least than in the conventional transmission system in which the information carrier had one chance in two to be recognized during the preceding bit.

It is to be understood that while the example described herein of the operation of the system of this invention employs three frequencies, it should be remembered that this is only an example and that the system will operate on other distinct conditions of the transmitted signal, such as, phase and amplitude conditions of the signal. It also should be noted that the system of this invention is not limited to the utilization of three distinct conditions of the transmitted signal, but other numbers of such conditions may be employed.

The above-mentioned and other features and objects of this invention will become more apparent by reference to the following description taken in conjunction with the accompanying drawings in which the single figure of the drawing is a schematic diagram in block form illustrating transmission system of this invention.

Referring to the figure, the transmission system of this invention basically includes a source of binary information 1 in the form of a plurality of binary bits having either "1" or "0" condition, a means 2 coupled to source 1 responsive to each of the bits at the output of source 1 to provide a given sequence of a plurality of distinct conditions, such as a plurality of distinct frequencies, for one condition of the bit and the opposite sequence of these distinct conditions for the other condition of the bits, and a means 3*a* coupled to means 2 responsive to the sequence of the distinct conditions to recover the bits as present at the output of source 1.

More particularly, the system of this invention includes a flip-flop circuit 3 coupled to the output of source 1 to control a distributor 4 for applying a plurality of signals having distinct predetermined characteristics sequentially to a transmission medium 5, the outputs of flip-flop 3 determining the particular sequence of the application of the signals to transmission medium 5. As an illustration, distributor 4 may include a scanning distributor having arm 4*a* coupled to the output of a clock pulse source 6 and rotated by reversible motor 7 to sequentially couple the clock pulses to "AND" gates 8, 9 and 10. The direction of rotation of the movable element of distributor 4 and, hence, the direction of the sequence, is determined by the outputs of flip-flop 3 controlling the direction of rotation of motor 10. For instance, the output of the "0" portion of flip-flop 3 drives motor 10 and arm 4*a* to rotate in the clockwise direction, as indicated by the solid line arrow, while the output of the "1" portion of flip-flop 3 drives arm 4*a* in a counterclockwise direction, as indicated by the broken line arrow. Thus, the output of clock pulse source 6 which times the application of the signals having the distinct characteristics to the transmission medium 5, is sequentially coupled to "AND" gates 8, 9 and 10 through their associated contacts of distributor 4. The output of source 6 also controls the output of source 1.

In accordance with the example employed herein for purpose of explanation, "AND" gates 8, 9 and 10 have their other input coupled to the outputs of signal generators 11, 12 and 13. Thus, the sequential application of the clock pulses from the distributor contacts to their associated "AND" gates open these "AND" gate circuits in sequence, and in a particular direction of sequence according to the condition of the binary bits, to apply the signals from generators 11, 12, and 13 to transmission medium 5.

At the receiving end of transmission medium 5 there are provided receivers 14, 15, and 16, each responding to a different one of the frequencies of the signals on transmission medium 5. The outputs of the receivers 14, 15, and 16 are coupled to three differentiators 17, 18, and 19, respectively, each of which provides an output pulse coincident with the initial instant of output from their associated receivers corresponding to the transition of the particular signal from a rest condition to an active condition or, in other words, the absence of the signal to the presence of the signal. These output pulses from differentiators 17, 18, and 19 are coupled to "OR" circuit 20 whose output is coupled to sync signal generator 21 to actuate this generator to provide output pulses coincident with the arrival of the particular signal detected by the particular receiver. Thus, through the use of the transition, or the instant of arrival of a signal having a particular frequency at the proper one of the receivers, the synchronizing signal generator is caused to apply an output to (the appropriate one of) "AND" gates 22, 23, and 24, to gate the output of the receiver coupled thereto to associated flip-flop circuits 25, 26 and 27. Through this arrangement the timing generator, or synchronizing signal generator 21, is synchronized with the output of clock pulse 6 without the incorporation of a separate synchronizing signal in the transmitted signal.

As mentioned hereinabove, the timing signals from generator 21 are applied to "AND" gates 22, 23, 24 to gate the output of the associated receivers 14, 15 and 16 to flip-flops 25, 26, and 27. Another way of accomplishing this is to gate the receivers 14, 15, and 16 with the output of generator 21 directly without utilizing the separate "AND" gates.

According to the output conditions of the receivers, depending upon the sequence of frequencies A, B and C on transmission medium 5, flip-flop circuits 25, 26 and 27 supply an appropriate output according to the presence or absence of the particular frequency on transmission medium 5. The outputs of the flip-flop circuits are coupled to a computer 28 which according to the respective conditions of the output signal from flip-flop circuits 25, 26 and 27 modify the condition of flip-flop circuit 29 in a manner to supply to output conductor 30, coupled to succeeding circuitry for recovery of the information represented by the binary bits, the binary information in the same form as was present at the output of source 1. Computer 28 is arranged to detect an error in the transmission and with a detection of such an error, an error signal is coupled to error signal transmitter 31 which includes an arrangement transmitting an error detected signal back to the transmitting station to request the retransmission of he faulty part of the message at a suitable moment.

The operation of the logical computer 28 will now be described utilizing the following symbols: A=the presence of frequency A, B=the presence of frequency B, C=the presence of frequency C, F=error and $\overline{A}$, $\overline{B}$, $\overline{C}$, and $\overline{F}$= the absence of the frequencies A, B, and C and an error F, respectively. Considering the possible conditions A′, B′ and C′, representing the preceding possible conditions, and A, B, C, representing the present conditions of the signals, computer 28 is provided with three pattern shift registers including two stages permitting the storage of the preceding condition and present condition. By employing a combination of logical AND circuits (symbol *x*) and OR circuits (symbol *y*), it is possible to detect the binary bit represented by the signals utilizing the preceding information and the present information and also to determine the presence or absence of an error. The logical circuits are set up according to the following rules:

(1) $(A' x B y B' x C y C' x A) x \overline{F}$="0"

(2) $(A' x C y B' x A y C' x B) x \overline{F}$="1"

(3) $A x B y B x C y C x A y \overline{A} x \overline{B} x \overline{C}$=F=error Referring to the components shown in block form in computer 28, there is illustrated one form the computer may assume to provide the bit represented by the frequency signals and how the presence of an error is detected following the rules set forth hereinabove. It, of course, will be obvious to those skilled in the art that computer 28 can take other forms provided the rules set forth hereinabove are followed.

In accordance with the examples illustrated, the outputs from flip-flops 25, 26 and 27 are coupled to shift registers 32, 33, and 34 capable of storing therein the present signal in the first stage, indicated by the A, B and C on the output leads therefrom and the preceding signal in the second stage indicated by A′, B′ and C′ on the output leads therefrom. Each of the stages contained in registers 32, 33, and 34 are coupled to "AND" circuits 35 arranged according to rules (1) and (2) to provide an output from the "AND" circuits when the conditions are present that will cause the "AND" circuits to open. The output of these "AND" circuits 35 are coupled to "OR" circuits 36 having their outputs coupled to further logic circuits associated with the error detection logic circuitry. The error detection circuitry includes three "AND" gates 37 coupled to the three outputs of flip-flops 25, 26 and 27 to meet the first three conditions of rule (3). The fourth condition of rule (3) is provided by coupled inverters 38 to each of the output lines of flip-flops 25, 26 and 27, thereby providing a pulse during the absence of an output from these flip-flops, no output indicating the absence of that particular signal. These inverters will provide a positive voltage or pulse which is then coupled to "AND" gate 39 which will be rendered operative by the outputs of inverters 38 only when all three outputs of flip-flops 25, 26 and 27 simultaneously indicate the absence of the signals having frequencies A, B, and C. The output from "AND" gate 39 is coupled to "OR" gate 40. The output of "OR" gate 41 is also coupled to "OR" gate 40. An output from "OR" gate 40 is indicative of the presence of an error in the signals received. This output is then coupled to transmitter 31.

Since it is desired during the occurrence of an error to prevent recovery of the bit and to meet rules (1) and (2), it is necessary to couple the outputs of "OR" gates 36 to "AND" gate 42 which remains blocked by no output from inverter 43 which is coupled to "OR" gate 40. As a result the bit cannot be recovered since flip-flop 29 remains inoperative. However, when there is no error, represented by no output from "OR" gate 40, inverter 43 provides an output signal sufficient to open "AND" gate 42 and pass the output signal of "OR" gate 36 to an "OR" gate 44 whose output is coupled to flip-flop 29.

While I have described above the principles of my invention in connection with specific apparatus, it is to be clearly understood that this description is made only by way of example and not as a limitation to the scope of my invention as set forth in the objects thereof and in the accompanying claims.

I claim:

1. A data transmission system comprising:
a source of binary bits;
first means coupled to said source responsive to each of said bits to provide a given sequence of at least three distinct conditions for one condition of said bits and the opposite sequence of said distinct conditions for the other condition of said bits; and
second means coupled to said first means responsive to the sequence of distinct conditions to recover said bits.

2. A data transmission system comprising:
a source of binary bits;
first means coupled to said source responsive to each of said bits to provide a given sequence of a plurality of distinct conditions for one condition of said bits and the opposite sequence of said distinct conditions for the other condition of said bits; and
second means coupled to said first means responsive to the sequence of distinct conditions to recover said bits;
said second means including means responsive to each of said distinct conditions to synchronize said second means with said first means.

3. A system according to claim 1, wherein said distinct conditions include at least three different frequencies.

4. A data transmission system comprising:
a source of binary bits;
first means coupled to said source responsive to each of said bits to provide a given sequence of a plurality of distinct conditions for one condition of said bits and the opposite sequence of said distinct conditions for the other condition of said bits; and
second means coupled to said first means responsive to the sequence of distinct conditions to recover said bits;
said distinct conditions including at least three different frequencies;
said second means including means responsive to each of said frequencies to synchronize said second means with said first means.

5. A data transmission system comprising:
a source of binary bits;
first means coupled to said source responsive to each of said bits to provide a given sequence of a plurality of distinct conditions for one condition of said bits and the opposite sequence of said distinct conditions for the other condition of said bits; and
second means coupled to said first means responsive to the sequence of distinct conditions to recover said bits;
said second means including means responsive to predetermined ones of said distinct conditions of one of said bits and predetermined ones of said distinct conditions of said bit preceding said one of said bits to detect the presence or absence of an error in said one of said bits to recover said one of said bits in the absence of an error and to block the recovery of said one of said bits in the presence of an error.

6. A system according to claim 5, wherein said second means further includes a means responsive to the detection of an error to request the retransmission of at least the faulty bit at a given time.

7. A system according to claim 5, wherein said given conditions include at least three different frequencies.

8. A data transmission system comprising:
a source of binary bits;
at least three source of signals each having a different frequency;
a transmission medium;
first means coupled to said source of binary bits and said three sources responsive to each of said bits to sequentially couple the signals of said plurality of sources to said transmission medium having one sequence for one condition of said bit and the opposite sequence for the other condition of said bit;
second means coupled to said transmission medium to provide an output signal in response to each of said signals of said three sources; and
third means coupled to said second means responsive to said output signals to reproduce each of said bits.

9. A data transmission system comprising:
a source of binary bits;
a plurality of sources of signals each having a different frequency;
a transmission medium;
first means coupled to said source of binary bits and said plurality of sources responsive to each of said bits to sequentially couple the signals of said plurality of sources to said transmission medium having one sequence for one condiiton of said bit and the opposite sequence for the other condition of said bit;
second means coupled to said transmission medium to provide an output signal in response to each of said signals of said plurality of sources; and
third means coupled to said second means responsive to said output signals to reproduce each of said bits;
said third means including means responsive to the transition of each of said output signals to synchronize said third means with said first means.

10. A data transmission system comprising:
a source of binary bits;
a plurality of sources of signals each having a different frequency;
a transmission medium;
first means coupled to said source of binary bits and said plurality of sources responsive to each of said bits to sequentially couple the signals of said plurality of sources to said transmission medium having one sequence for one condition of said bit and the opposite sequence for the other condition of said bit;
second means coupled to said transmission medium to provide an output signal in response to each of said signals of said plurality of sources; and
third means coupled to said second means responsive to said output signals to reproduce each of said bits;
said third means including means responsive to said output signals to detect the presence of an error in the signals on said transmission medium.

11. A system according to claim 10, wherein means are coupled to said means to detect to prevent the reproduction of said bits in the presence of an error and request retransmission of the faulty signals.

12. A data transmission system comprising:
a source of binary bits;
a plurality of sources of signals each having a different frequency;
a transmission medium;
first means coupled to said source of binary bits and said plurality of sources responsive to each of said bits to sequentially couple the signals of said plurality of sources to said transmission medium having one sequence for one condition of said bit and the opposite sequence for the other condition of said bit;

second means coupled to said transmission medium to provide an output signal in response to each of said signals of said plurality of sources; and third means coupled to said second means responsive to said output signals to reproduce each of said bits;

said third means including a signal path for each of said signals of said plurality of sources, each of said paths including fourth means producing an output signal in response to its associated signal of said plurality of sources, fifth means coupled to said fourth means responsive to the start of said output signal to produce a trigger signal, and sixth means coupled to said fourth means responsive to said output signal to produce a signal representative of said associated signal;

seventh means coupled in common to each of said fifth means and each of said sixth means to time the operation of said sixth means in accordance with said trigger signals;

eighth means coupled in common to each of said sixth means to detect an error in the signals on said transmission medium;

ninth means coupled in common to said sixth means and to said eighth means to reproduce said bit in the absence of an error; and tenth means coupled to said eighth means to request retransmission of the faulty signals.

13. A system according to claim 12, wherein said ninth means includes a plurality of register means each coupled to one of said sixth means to store the signals representing one bit and the signals representing the preceding bit; and logic circuitry coupled to said register means to detect the frequency sequence from one signal of said preceding bit and the adjacent signal of said one bit to reproduce said bit in the absence of an error.

14. A data transmission system comprising:

a source of binary bits;

a plurality of sources of signals each having a different frequency;

a transmission medium;

first means coupled said source of binary bits and said plurality of sources responsive to each of said bits to sequentially couple the signals of said plurality of sources of said transmission medium having one sequence for one condition of said bit and the opposite sequence for the other condition of said bit;

second means coupled to said transmission medium to provide an output signal in response to each of said signals of said plurality of sources; and third means coupled to said second means responsive to said output signals to reproduce each of said bits;

said first means including a source of timing signals; and distributor means coupled to said source of timing signal and said plurality of sources responding to the condition of each of said bits to determine the sequence in which the signals of said plurality of sources are coupled to said transmission medium.

15. A transmitter for a data transmisison system comprising:

a source of binary bits;

at least three sources of signals each having a distinct predetermined characteristics;

a transmission medium; and a distributor arrangement coupled to said source of binary bits and said three sources responsive to each of said bits to sequentially couple the signals of said three sources of said transmission medium having one sequence for one condition of said bit and the opposite sequence for the other condition of said bit.

16. A transmitter according to claim 15, wherein said distinct characteristics include at least three different frequencies.

17. A receiver for a data transmission system comprising:

a transmission medium coupled to a distant transmitter carrying a given sequence of at least three different signal conditions representing one condition of a single bit of a binary code group and the opposite sequence of said different signal conditions representing the other condition of said single bit;

receiving means coupled to said medium to provide an output signal in response to each of said signal conditions; and a logical circuitry means coupled to said receiving means responsive to said output signals to detect one of said given sequence and said opposite sequence to reproduce each of said bits.

18. A receiver according to claim 17, wherein said logical circuitry means includes a detector to detect the start of each of said signal conditions to synchronize said circuitry with said distant transmitter.

19. A receiver according to claim 17, wherein said different signal conditions includes at least three distinct frequencies.

20. A receiver according to claim 17, wherein said logical circuitry includes logical components responsive to said output signals to detect the present of an error in a sequence of signal conditions on said transmission medium to prevent reproduction of said bits in the presence of an error and request retransmission of the faulty sequence of signal conditions.

References Cited by the Examiner

UNITED STATES PATENTS

| | | | |
|---|---|---|---|
| 2,235,755 | 3/1941 | Bakker et al. | 340—146.1 |
| 2,522,893 | 9/1950 | Purrington | 340—147 |
| 2,805,278 | 9/1957 | Van Duuren | 340—146.1 |
| 2,995,626 | 8/1961 | Van Duuren | 340—146.1 |

MALCOLM A. MORRISON, *Primary Examiner.*

ROBERT C. BAILEY, *Examiner.*

M. P. ALLEN, *Assistant Examiner.*